United States Patent
Abel et al.

(10) Patent No.: US 8,245,975 B2
(45) Date of Patent: Aug. 21, 2012

(54) LOAD-SUPPORTING AND DAMAGE-TOLERANT LAMINATED AIRCRAFT WINDOW

(75) Inventors: Bengt Abel, Hamburg (DE); Klaus Edelmann, Bremen (DE); Arne Hartwig, Hamburg (DE); Klaus Hoppmann, Delmenhorst (DE); Jens Wleting, Bremen (DE)

(73) Assignee: Airbus Operations GmbH, Hamburg (DE)

( * ) Notice: Subject to any disclaimer, the term of this patent is extended or adjusted under 35 U.S.C. 154(b) by 100 days.

(21) Appl. No.: 12/839,845

(22) Filed: Jul. 20, 2010

(65) Prior Publication Data
US 2011/0017871 A1    Jan. 27, 2011

Related U.S. Application Data

(63) Continuation of application No. PCT/EP2009/050972, filed on Jan. 29, 2009.

(60) Provisional application No. 61/063,625, filed on Feb. 5, 2008.

(30) Foreign Application Priority Data

Feb. 5, 2008 (DE) .................. 10 2008 007 545

(51) Int. Cl.
*B64C 1/14* (2006.01)
(52) U.S. Cl. .................. 244/129.3; 296/190.1; 296/200; 296/84.1; 296/201; 52/204.7; 52/773; 52/774
(58) Field of Classification Search ............. 244/129.3; 296/190.1, 200, 84.1, 201; 52/204.7, 773, 52/774
See application file for complete search history.

(56) References Cited

U.S. PATENT DOCUMENTS

| | | | |
|---|---|---|---|
| 3,616,122 | A | 10/1971 | Orcutt |
| 3,919,022 | A | 11/1975 | Stefanik |
| 5,039,566 | A | 8/1991 | Skubic et al. |
| 5,941,596 | A | 8/1999 | See |
| 6,582,792 | B1 | 6/2003 | Godbehere et al. |
| 7,527,846 | B2 | 5/2009 | Roebroeks |
| 2004/0062934 | A1 | 4/2004 | Miller et al. |
| 2005/0053765 | A1 | 3/2005 | Albers et al. |

FOREIGN PATENT DOCUMENTS

| | | |
|---|---|---|
| DE | 69418464 T2 | 9/1999 |
| DE | 69917048 T2 | 9/2004 |
| DE | 102005010252 | 3/2006 |
| DE | 60129560 | 1/2008 |
| WO | WO 00/20275 | 4/2000 |

OTHER PUBLICATIONS

German Office Action for DE 10 2008 007 545 dated May 29, 2008.
International Search Report for PCT/EP2009/050972 dated May 25, 2009.

*Primary Examiner* — J. Woodrow Eldred
(74) *Attorney, Agent, or Firm* — Jenkins, Wilson, Taylor & Hunt, P.A.

(57) ABSTRACT

The invention relates to a vehicle window consisting of a transparent composite material, wherein the composite material comprises fibers and a matrix material such that the vehicle window is capable of withstanding structural loads occurring in the window region and can substantially provide the window function even in spite of damage to the vehicle window (damage-tolerant), the fibers and the matrix material being transparent and substantially having the same refractive index. The invention proposes vehicle windows which are damage-tolerant, load bearing, cost-saving, easy to handle and require less installation space than conventional vehicle windows.

14 Claims, 3 Drawing Sheets

LOAD-SUPPORTING AND DAMAGE-TOLERANT LAMINATED AIRCRAFT WINDOW

CROSS-REFERENCE TO RELATED APPLICATIONS

This application is a continuation of PCT/EP2009/050972 filed Jan. 29, 2009 and claims the benefit of U.S. Provisional Application No. 61/063,625, filed Feb. 5, 2008 and German Patent Application No. 10 2008 007 545.0, filed Feb. 5, 2008, the entire disclosures of which are herein incorporated by reference.

FIELD OF THE INVENTION

The invention relates to a window for a vehicle, in particular for an aircraft. Nowadays, conventional aircraft windows usually have a window frame, an inner and outer window pane, seals, a retaining element (also called a "retainer") and connection elements for connecting the window to the aircraft. In this respect, the inner and outer window panes form together with the seal a so-called window set. During flight operation, the outer window pane integrated in the window set only withstands those loads which result from the differential pressure between the interior of the aircraft cabin and the surroundings. All other loads which occur, for example in the fuselage structure are conducted around the window aperture, inter alia, by a window frame which strengthens the window aperture.

Conventional aircraft windows are usually configured by the fail-safe method of construction such that, should the outer window pane malfunction during the flight due to a load transfer, the cabin pressure can be maintained by the inner window pane, thus ensuring a safe landing of the aircraft.

Apart from actually sealing the window set from the surroundings, the seal of a conventional aircraft window also provides the connection and positioning of the window set in the window frame. In addition, the seal ensures the correct spacing between the inner and outer window panes.

To achieve a visually perfect joint pattern on the outside of the aircraft, the window set has to be mounted in an extremely precise manner. The retaining element holds the window set in the window frame such that it cannot fall out either during assembly or if there is a drop in pressure towards the interior.

The conventional vehicle and aircraft windows which have been described suffer from a number of disadvantages. On the one hand, the size of the window is restricted by the shape and stress produced on the window frame. Furthermore, the production of the window panes by a conventional reinforcing method is expensive. In addition, the material of the window shrinks under the influence of heat, ages with the formation of hairline cracks and reacts sensitively to chemical influences (for example alcohol). The large number of elements means that assembly is complex due to careful handling of the window set, the required precise positioning in the window frame and the large number of connection elements.

SUMMARY OF THE INVENTION

The object of the invention is to reduce or eliminate the disadvantages described above. A particular object of the invention is to propose a window for an aircraft which is not only easily assembled in a precise manner, but is also configured to be damage-tolerant and is capable of withstanding all the structural loads which occur in the window region.

The object is achieved by a window for a vehicle which has a transparent, damage-tolerant pane element produced from a composite material, said pane element being capable of withstanding structural loads.

The characteristic of the window according to the invention is based on the fact that the window is fully load bearing. Due to the load-bearing configuration of the window, according to the exemplary use in an aircraft, a significant amount of weight can be saved, particularly compared to conventional aircraft windows, which results from the omission of a window frame and retaining element.

The composite material preferably comprises fibres and a matrix material, the fibres and matrix material being transparent and having substantially the same refractive index. The use of the same refractive index means that the composite material has optically constant characteristics and consequently the fibres are virtually invisible. Concurrently with the transparency characteristics necessary for a window, the window according to the invention has the mechanical characteristics of a fibre composite material, imparting to the window a very high strength and adapted rigidity. This also entails a reduction in weight, since the window is not only able to withstand the loads from the differential pressure between the interior of the vehicle and the surroundings, but also the structural loads occurring around the window. Consequently, a window frame guiding these loads around the window is unnecessary.

In addition, further advantages in terms of weight and cost are provided by the damage tolerance of the window according to the invention, because the load-bearing characteristics can ensure safe operation of the aircraft even if the window is damaged.

Furthermore, the window according to the invention can be freely configured in size and shape by its damage-tolerant and load-bearing construction. The material used is also more resistant to ageing and thus requires less maintenance. Finally, due to the smaller overall height since a second (inner) window pane is omitted, the passenger is afforded more shoulder space.

Finally, a high quality of the outer surface of the vehicle can be achieved at a substantially lower expense compared to the use of conventional windows, because the window frame and seals which potentially jut out and disturb the smooth surface are omitted.

The object is further achieved by a method for producing a vehicle window which has the features mentioned above.

BRIEF DESCRIPTION OF THE DRAWINGS

In the following, the invention will be described in detail with reference to the figures using embodiments of an aircraft window. In the figures, the same items are characterised by the same reference numerals.

DESCRIPTION OF EXEMPLARY EMBODIMENTS

Figure 1A:
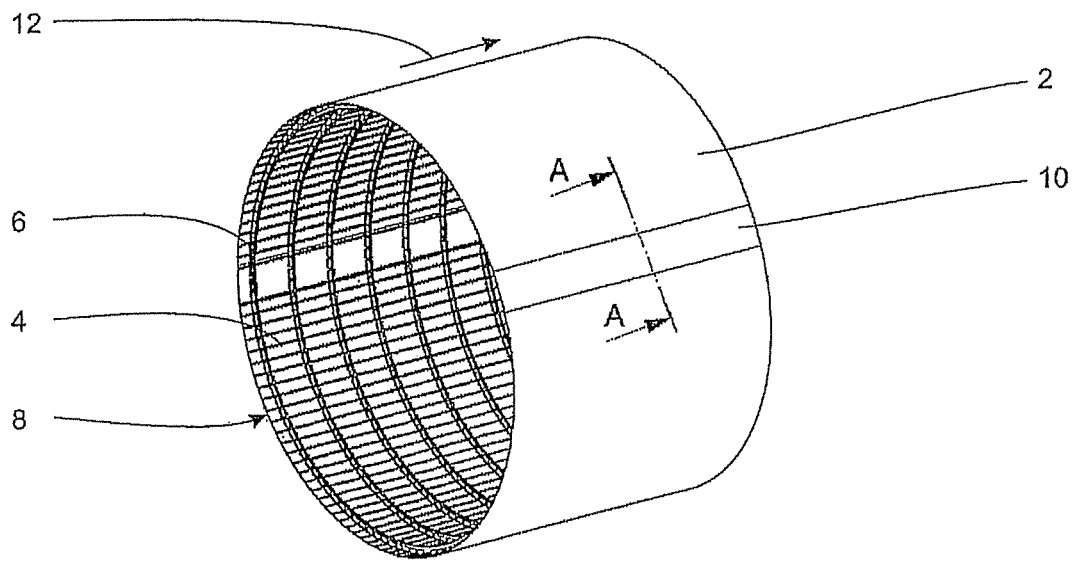
FIG. 1a: is a schematic view of a fuselage portion with an oblong aircraft window.

The portion of an aircraft fuselage 2 shown in FIG. 1a has by way of example an arrangement of stringers 4 for longitudinal reinforcement and formers 6 for transverse reinforcement of the fuselage 2. The stringers 4 and formers 6 are arranged on the inside of the skin 8 of the aircraft fuselage 2 and are attached thereto. This illustration of an aircraft fuselage 2 produced by the barrel construction method is to be understood merely as an example and is not to be interpreted as a restriction of the invention. The modes of operation and advantages of the invention described in the following are also conceivable in connection with alternative fuselage construction methods and any fuselage materials which can render superfluous the presence of, for example stringers or other strengthening or reinforcing components.

Furthermore, in the selected example, an aircraft window 10 according to the invention is integrated into the skin 8 and has a strip-like, oblong shape and extends at least in portions substantially parallel to the longitudinal direction 12 of the aircraft. It is not necessary, at least in the barrel construction method, for the aircraft window 10 to extend over the entire length of a fuselage portion (barrel). Depending on requirements, any length of the aircraft window 10 can be selected in the configuration, regardless of predefined fuselage portions. The aircraft window 10 is realised as a transparent pane element produced from a composite material. The composite material is preferably a fibre composite material with fibres and a matrix material. The fibres are transparent and have substantially the same refractive index as the matrix material. Due to the identical and constant refractive index within the entire material, the fibres can no longer be detected in the material itself. When selecting the transparent fibres (for example glass fibres or polymer fibres) which, in an optimum case, have an appropriate sizing and/or appropriate finish and an appropriate matrix material based on synthetic polymer plastics materials (purely by way of example, these could be epoxy resin, phenol resin or another type of resin among many other possible plastics materials), the composite material has transparency characteristics suitable for window panes. The fibre material can be in any form, whether as individual fibre strands, braiding or mats with random fibres. Regarding the usability of phenol resins, it is noted here that although cured phenol resin frequently becomes friable or brittle when loaded mechanically, its behaviour in fire in respect of melting resistance and similar parameters is, however, more favourable compared to epoxy resins. Therefore, the use of phenol resin for the production of aircraft windows according to the invention should not be ruled out in principle.

Figure 1B:
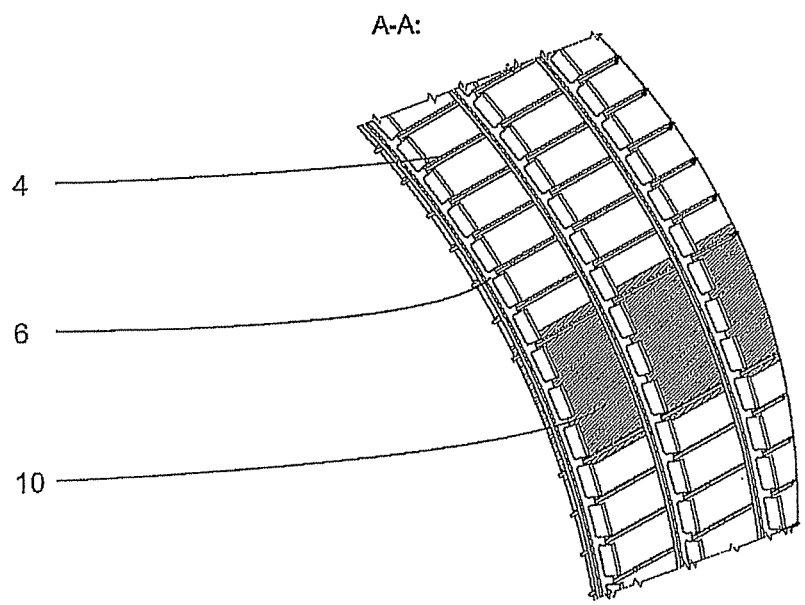
FIG. 1b: is a side view of a fuselage portion with an oblong aircraft window.

FIG. 1b is a sectional view of an exemplary attachment variant of the window 10 to the skin 8, the cutting plane of said sectional view being indicated in FIG. 1a. FIG. 1b shows that the aircraft window 10, like the remaining parts of the skin 8, forms an integral part of the skin 8 as a shell element ("panel"), both in the barrel construction method and in the shell construction method. This means that the skin 8 is composed of a plurality of shell elements or barrels and the shell elements configured as the aircraft window 10. An aircraft window 10 according to the invention which, as shown, is oblong can be conventionally connected in a positive, non-positive or material-uniting manner (for example bolted, welded or bonded) to the adjoining shell elements or barrels.

The assembly of an oblong aircraft window 10 is particularly advantageous compared to conventional aircraft windows, because an aircraft window does not to be composed of an inner and outer pane, the seal and the retaining element and does not have to be fitted in the skin 8 for every row of seats inside the aircraft cabin. The shell element configured as an aircraft window 10 can be processed and mounted almost as easily as a conventional shell element. Furthermore, the reach of the aircraft window 10 into the passenger cabin of the aircraft is very small due to the thickness of the aircraft window 10. If the provision of defined window regions is required for the individual rows of seats in the aircraft cabin, it is possible for transparent regions in the aircraft window 10 to be defined by purposefully configurating the inner lining of the cabin and the lacquer coat of the aircraft fuselage. These transparent regions can assume any geometric shape and are not restricted in terms of area.

Handling a shell element configured as an oblong aircraft window 10 compared to conventional aircraft windows is also particularly simple since, in an optimum case, no additional window reinforcements in the form of window frames or the like are required. The aircraft window 10 according to the invention is itself rigid enough and strong enough to be able to withstand all arising structural loads by itself and to satisfy the additional damage tolerance requirements. Conventional reinforcing components of stringers 4 and formers 6 can also be fitted in the region of the aircraft window 10. The integration of an additional (second) pane to the actual window 10 is not required, because the aircraft window 10 is configured to be damage-tolerant. This means that the aircraft window 10 is strong enough, even if it is damaged, to reliably ensure the sealing of the fuselage and to withstand the structural loads during the entire life of the aircraft.

Figure 2A:
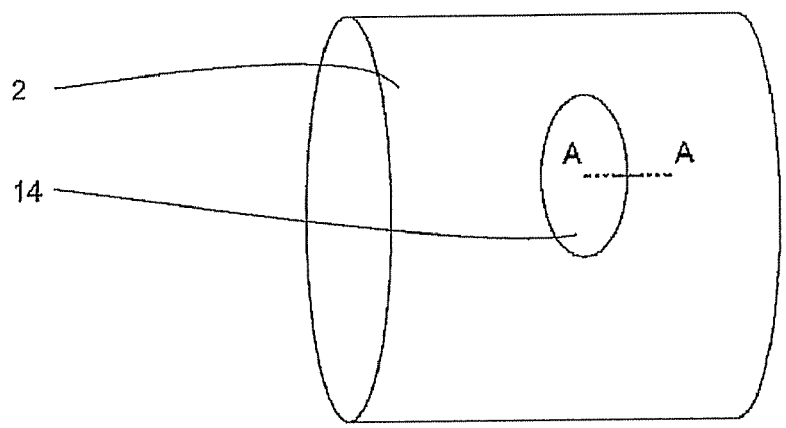
FIG. 2a: is a schematic view of a fuselage portion with a laminated-in aircraft window.
Figure 2B:
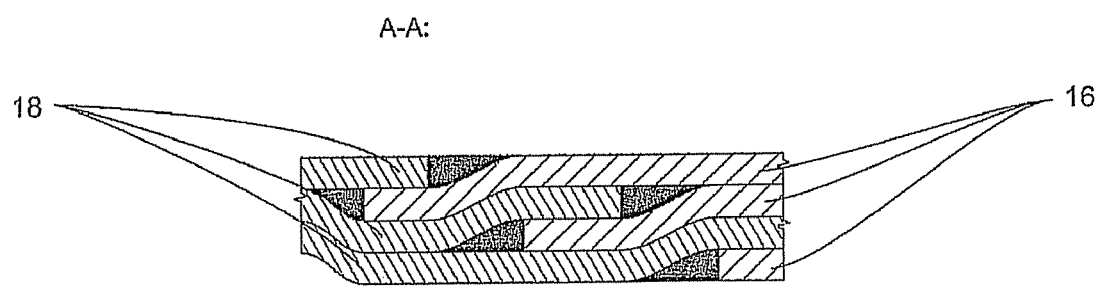
FIG. 2b: is a sectional view of a skin with a laminated-in aircraft window.

A further embodiment is shown in FIGS. 2a and 2b with a laminated-in aircraft window 14 which has by way of example an oval shape. The application of this embodiment is restricted to aircraft fuselage 2 which consist of a composite material such as fibre composite materials or fibre-metal laminates or the like. Here, the structural base material is substituted in regions in window positions by the transparent fibre composite material according to the invention in order to make the fuselage structure transparent in these regions.

FIG. 2b shows an example of a laminate layer substitution. The structural base material consists of a plurality of laminate layers 16 which are overlapped by transparent laminate layers 18. Accordingly, the region in FIG. 2b to the left in the plane of the drawing is transparent, while the region to the right is not. However, it must be possible to ensure in this respect that the matrix material to be used for the window according to the invention can also be used as matrix material for the structural base material or that at least there is a material compatibility. In addition to the overlapping method of construction, the manner of integrating the window into the structure is also conceivable by specific fibre semi-finished products into which transparent regions are integrated. All possible manufacturing methods for the production of laminates can be used against the background of the laminate layer substitution and comprise, to name but a few, pregreg processes, wet laminating processes and also dry or infusion processes. The type of substitution of the laminate layers does not have to correspond to the variant shown in FIG. 2b. The laminate layers do not have to be substituted 1:1, so that the laminate thickness can also vary in alternative overlap methods.

For additional reinforcement, frame-like structures can be integrated by locally adapting the laminate. Furthermore, where there are relatively large windows, it is imaginable to also possibly laminate in, bond on or bind on using connection elements transparent reinforcing elements in the visible region of the aircraft window.

An additional embodiment (not shown) comprises windows which are produced from a transparent fibre composite material and are not held in a frame but are screwed, bolted or bonded directly with the structure surrounding the window. This is possible because the windows are able to transmit loads due to their static characteristics, which loads would otherwise have to be guided around the window by the window frame in the case of conventional windows.

To achieve improved static characteristics of the window, the edge of the window connected to the surrounding structure can be reinforced or thickened by structural profiles or other transparent or non-transparent materials. Reinforcements of this type are also possible in the visible region of the window as long as they do not unacceptably restrict the vision.

Figure 3:
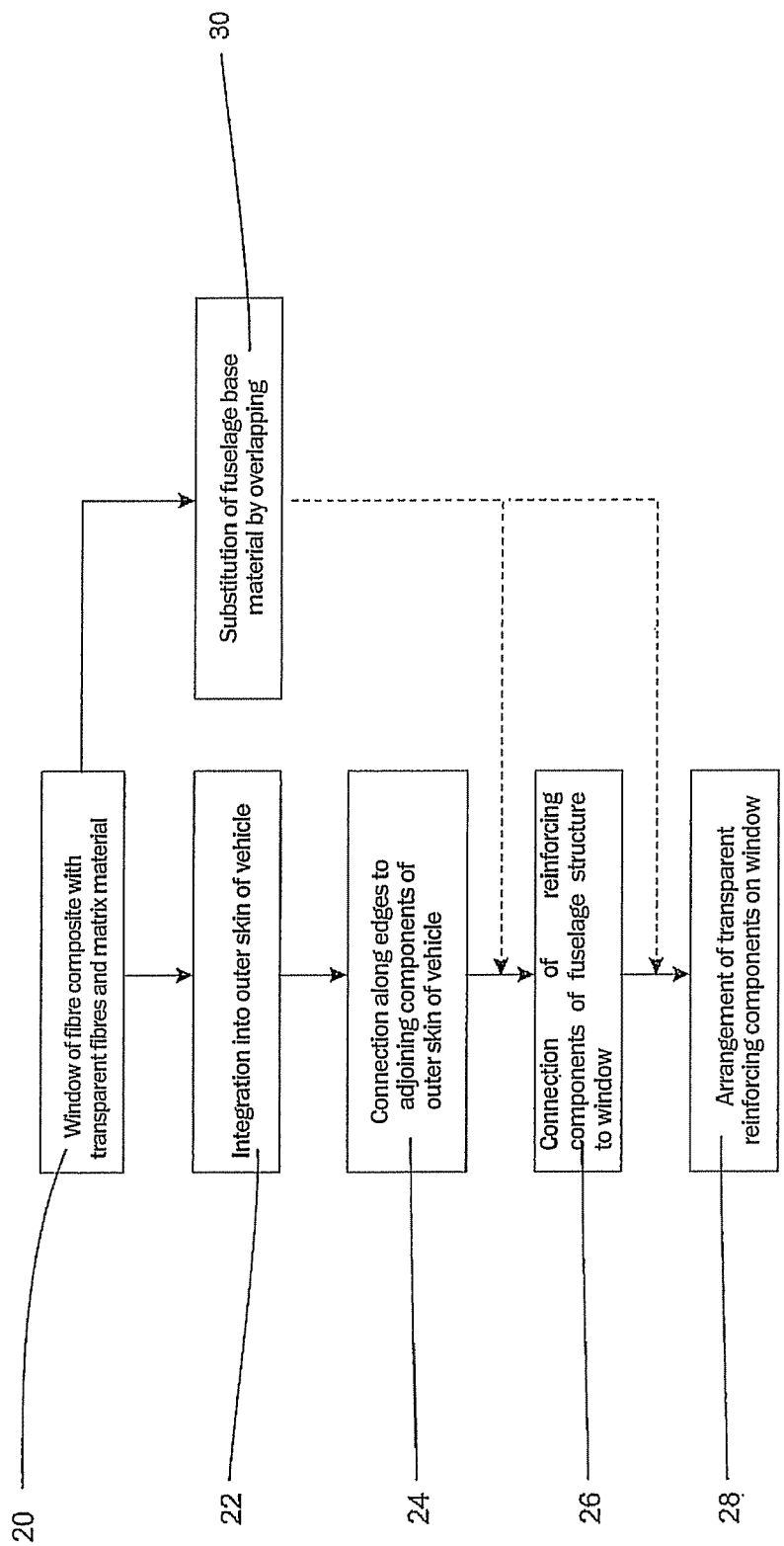
FIG. 3: is a schematic diagram of a method for the production of an aircraft window according to the invention.

The fundamental steps of the method for producing a vehicle window having the features according to the invention are illustrated with reference to FIG. 3 which will be described in the following using the example of an aircraft window.

The aircraft window is configured 20 from a fibre composite having transparent fibres and a matrix material which is integrated 22 into the aircraft skin, for example by connecting 24 the edges to adjoining components of the aircraft skin. Reinforcing components of the aircraft fuselage can also be connected 26 to the window; likewise if necessary, it is possible for transparent reinforcing components to be arranged 28 on the window to increase the strength thereof.

As an alternative to integrating the window into the skin by connecting along the edges, the substitution of base material of the fuselage could also be considered, for example by the previously described overlap method 30.

The vehicle window presented according to the invention provides a significant reduction in weight and cost compared to conventional vehicle windows, which is basically attributed to the load-bearing and damage-tolerant characteristics. The invention is described on the basis of a plurality of embodiments which relate in particular to aircraft windows. These embodiments should not be understood as restricting the invention, but are merely to illustrate the invention. The claimed application field is defined by the claims which provide a use in any vehicle. In addition to aircraft, any motor vehicles, trains, water craft and the like can be fitted with the vehicle windows according to the invention.

The invention claimed is:

1. A vehicle comprising:
a vehicle fuselage made of a composite material comprising a plurality of laminate layers; and
a vehicle window consisting of a transparent composite material, wherein the composite material comprises fibers and a matrix material such that the vehicle window is capable of withstanding structural loads occurring in the window region and can substantially provide the window function even in spite of damage to the vehicle window, the fibers and the matrix material being transparent and having substantially the same refractive index, the vehicle window substituting the composite material of the vehicle fuselage in window positions thereof, and the vehicle window being produced from a plurality of laminate layers and the laminate layers of the vehicle window overlapping with the laminate layers of the vehicle fuselage.

2. The vehicle according to claim 1, wherein the vehicle window has an oblong shape and, when installed, extends substantially parallel to a direction axis of the vehicle as an integral component along the skin of the vehicle.

3. The vehicle according to claim 2, wherein when installed, the vehicle window is connected along the edges to adjoining components of the skin of the vehicle.

4. The vehicle according to claim 2, wherein in the vehicle window, reinforcing components of the structure of the vehicle fuselage run along the inside of the vehicle window when it is installed and are connected to the vehicle window.

5. The vehicle according to claim 1, wherein the vehicle window has transparent reinforcing components to increase the rigidity and strength.

6. The vehicle according to claim 1, wherein the vehicle window is formed from fibers which are transparent in the window positions of the vehicle fuselage.

7. The vehicle according to claim 1, wherein the vehicle window can be connected directly to the structure, surrounding the vehicle window, of the vehicle fuselage without additional window frames.

8. A method for producing a vehicle window in a fuselage of a vehicle, the method comprising:
providing a fuselage made of a composite material comprising a plurality of laminate layers;
providing a vehicle window made from a transparent composite material comprising a plurality of laminate layers, wherein the composite material is formed with fibers and a matrix material such that the vehicle window is capable of withstanding structural loads occurring in the window region and can substantially provide the window function even in spite of damage to the vehicle window, the fibers and the matrix material being transparent and having substantially the same refractive index,
substituting the composite material of the fuselage in window positions thereof with the vehicle window and overlapping the laminate layers of the vehicle with the laminate layers of the vehicle fuselage.

9. The method according to claim 8, wherein the vehicle window is integrated into the skin of the vehicle as an integral component, the vehicle window having an oblong shape and, when installed, extends substantially parallel to a direction axis of the vehicle.

10. The method according to claim 9, wherein the vehicle window is connected along the edges to adjoining components of the skin of the vehicle.

11. The method according to claim 9, wherein reinforcing components of the structure of the aircraft fuselage are arranged to run along the inside of the vehicle window and are connected to the vehicle window.

12. The method according to claim 8, wherein transparent reinforcing components are arranged on the vehicle window to increase the rigidity and strength.

13. The method according to claim 8, wherein the vehicle window is formed from fibres which are transparent in the window positions of the vehicle fuselage.

14. The method according to claim 8, wherein the vehicle window is directly connected to the structure, surrounding the vehicle window of the vehicle fuselage without additional window frames.

* * * * *